United States Patent [19]
Rutterman

[11] Patent Number: 5,917,978
[45] Date of Patent: Jun. 29, 1999

[54] BUFFERED OPTICAL FIBER HAVING IMPROVED LOW TEMPERATURE PERFORMANCE AND STRIPABILITY

[75] Inventor: Daniel J. Rutterman, Hudson, N.C.

[73] Assignee: Siecor Corporation, Hickory, N.C.

[21] Appl. No.: 08/779,753

[22] Filed: Jan. 10, 1997

[51] Int. Cl.[6] .................................................. G02B 6/44
[52] U.S. Cl. ........................................................ 385/109
[58] Field of Search ..................................... 385/109–113

[56] References Cited

U.S. PATENT DOCUMENTS

| | | | |
|---|---|---|---|
| 4,153,332 | 5/1979 | Longoni | 350/96.23 |
| 4,230,395 | 10/1980 | Dean et al. | 385/109 |
| 4,647,651 | 3/1987 | Grogl et al. | 385/109 |
| 4,659,174 | 4/1987 | Ditscheid | 350/96.23 |
| 4,723,831 | 2/1988 | Johnson et al. | 350/96.23 |
| 4,826,278 | 5/1989 | Gartside et al. | 350/96.23 |
| 5,181,268 | 1/1993 | Chien | 385/128 |
| 5,201,020 | 4/1993 | Kannabiran | 385/109 X |
| 5,325,457 | 6/1994 | Bottoms, Jr. et al. | 385/113 |
| 5,408,564 | 4/1995 | Mills | 385/128 |
| 5,621,841 | 4/1997 | Field | 385/113 |
| 5,751,880 | 5/1998 | Gaillard | 385/109 |

OTHER PUBLICATIONS

"First Optical Cable Link of the Deutsche Bundespost", Reprint from "telecom report" vol. 2, No. 3, Sep. 1979, pp. 169–173. Authors: Peter Kahl, Gunter Kostler, Alfred Laufer and Hans Wartmann.

"Miniature Optical Fiber Cables for Jumper Applications", International Wire & Cable Symposium Proceedings 1994, pp. 183–188, Authors: Don Mathis, Montri Viriyayuthakorn, Jim Holeman, Lionell Graham and Randy Reagan, AT&T Bell Laboratories, Norcross, Georgia [no month].

Siecor Product Information CTB–83A, 1992 "900μm OptiStrip Buffered Fiber" [no month].

Siecor Product Information CTB–84A, 1992 "Single–Fiber OptiStrip Cable" [no month].

Siecor Product Information CTB–110, Dec. 1995, TBII™ Buffered Fiber.

Siecor Product Information CTB–91, 1993 "Pacific Bell Model 8 OptiStrip Cable" [no month].

Corning™ Optical Fiber Product Information PI1036, Mar. 1996, Corning® SMF–28™ CPC6 Single–Mode Optical Fiber, Mar. 1996.

*Primary Examiner*—John D. Lee

[57] ABSTRACT

A buffered optical fiber includes a coated optical fiber loosely contained within a space delimited by the inner surface of a plastic tube. The outer surface of the coated optical fiber is formed of non-stick material such as TEFLON. No filler material is inserted between the coated optical fiber and the inner surface of the plastic tube. The plastic tube may have an inner diameter of 400 μm and an outer diameter of 900 μm. The buffered optical fiber is suitable for use in interconnect cables.

34 Claims, 1 Drawing Sheet

BUFFERED OPTICAL FIBER HAVING IMPROVED LOW TEMPERATURE PERFORMANCE AND STRIPABILITY

BACKGROUND OF THE INVENTION

This invention relates to an optical element for use in cables. The optical cable element includes a coated optical waveguide fiber loosely contained in a tube whose nominal outer diameter may be 900 μm.

Optical waveguide fibers, herein called optical fibers, typically comprise a glass core and a cladding. The core normally has an index of refraction which is greater than that of the cladding. During manufacturing, the cladding is typically coated with one or more layers of a thin plastic material, such as a UV-curable acrylate polymer. As used herein, this initial protective layer or layers will be referred to collectively as the fiber's "first protective coating". Typical outside diameters for an optical fiber are approximately 8 μm for a single mode core (or 50–62.5 μm for a multimode core), 125 μm for the cladding, and 250 μm for the first protective coating. For example, Corning's SMF-28™ CPC6 single-mode optical fiber, optimized for use in the 1310 nm wavelength region, has a core diameter of 8.3 μm, a cladding diameter of 125 μm, and a first protective coating diameter of 245±10 μm. Optical fibers having a first protective coating will be referred to as "coated optical fibers".

Coated optical fibers may be used in telephony, cable television, marine, and private network applications for the transmission of data, voice, and/or video.

Coated optical fibers usually are colored and given additional protection before they are put to use in a particular application. "900 μm buffered fiber" is the term used for a product having a standard size outer diameter of 900 μm and including a single coated optical fiber. For example, Siecor's 900 μm OptiStrip buffered fiber includes a coated optical fiber having an outer diameter of 250 μm which is surrounded by a layer of loose aramid fiber yarn. The layer of aramid fiber yarn is contained within a tube formed of plastic material and having an outer diameter of 900 μm. This product has a specified short term maximum tensile load of 6 N, a specified long term maximum tensile load of 3 N, a specified short term minimum bend radius of 5.0 cm, and a specified long term minimum bend radius of 3.0 cm.

A single 900 μm buffered fiber may be incorporated into a single fiber cable. Cables including 900 μm buffered fibers typically are designed for indoor use. For example, in Siecor's single-fiber OptiStrip cable, the Siecor 900 μm OptiStrip buffered fiber is surrounded by a second layer of aramid fiber yarn which is contained within an outer jacket formed of plastic material. This product has an outer diameter of 2.9 mm and a weight of 7 kg/km. The product complies with Bellcore specification TR-NWT-000409, and has the following mechanical and environmental specifications:

| | |
|---|---|
| Maximum tensile load (short term, long term) | 220 N, 88 N |
| Minimum bend radius (short term, long term) | 5.0 cm, 3.0 cm |
| Crush resistance | 3.5 N/mm |
| Impact resistance | 20 cycles |
| Cyclic flex resistance | 100 cycles |
| Maximum vertical rise | 1000 m |
| Storage temperature | −40 to +70° C. |
| Operating Temperature | 0 to +50° C. |

Other optical cables include a plurality of 900 μm buffered fibers. Examples are Siecor's MIC and UMIC cables. These cables have not met the −20° C. low operating temperature objective set by Bellcore TR-409. The low operating temperature for these cables has been −10° C.

In optical fiber products, a layer of aramid fiber yarn typically acts primarily as a tensile strength member. The layer of aramid fiber provided in OptiStrip buffered fiber is not designed to serve as a tensile strength member; this is reflected by its low maximum tensile load specification. Instead, the layer of aramid fiber yarn has been provided for cable processing considerations. Specifically, the layer of aramid fiber acts to separate the coated optical fiber from the tube having an outer diameter of 900 μm. If the coated optical fiber outer surface contacts the tube, they have tended to stick to each other. This sticking tends to degrade low temperature performance, as the coated optical fiber may well have a coefficient of thermal expansion different from that of the tube. The aramid yarn layer also tends to improve strippability of the product.

The addition of the aramid fiber yarn layer has some disadvantages of its own, however, in that it adds to the cost of the product, and adds an additional yarn application step. Sticking has not presented a problem for coated optical fibers if the space between the coated optical fibers and the tube is sufficiently great. Siemens Telecom Report Vol. 2, No. 3, September 1979, on page 169 presents an optical fiber cable including buffer tubes having an outer diameter of about 1.4 mm enclosing coated optical fibers having an outer diameter of about 0.14 mm. No aramid yarns or other fillers are inserted between the coated optical fiber and the buffer tube.

A problem in cables having no fillers and less free space between the coated optical fibers and the enclosing protective tube is how to omit the aramid yarn layer, which is not recommended for use during cable pulling, without degradation of a cable's low temperature performance or strippability. 900 μm (0.9 mm) is a smaller outer diameter than 1.4 mm, and this problem exists in particular for cables containing 900 μm buffered fibers.

SUMMARY OF THE INVENTION

It is therefore an object of the present invention to provide cables including 900 μm buffered fibers which advantageously omit the aramid fiber yarn layer from the 900 μm buffered fibers while maintaining low operating temperature performance.

A further object of the invention is to do so while improving low operating temperature performance or strippability.

Yet another object of the invention is to improve the efficiency of extrusion lines and connectorization.

These and other objects are provided, according to the present invention, by a 900 μm buffered fiber which has no aramid fiber yarn layer or other fillers between the coated optical fiber and the protective tube. The problem of sticking is instead avoided by forming the outer surface of the coated optical fiber of a non-stick material. One such non-stick material is a mixture comprising a solid lubricant and a film-forming binder. In one embodiment, the mixture may be crosslinked. In an alternative embodiment, the mixture may be applied wholly or in part through the use of a liquid carrier, such as water.

The invention further includes cables including one or a plurality of 900 μm buffered fibers as described in the immediately preceding paragraph. These inventive cables now meet low operating temperature requirements of 0° C. (for single-fiber cables) or −20° C. (for multi-fiber cables).

The strippability of the improved cables is enhanced. Due to the non-stick coating on the coated optical fiber and the air gap around it, the improved cables may be stripped to any practical length.

Removal of the strength members about the coated optical fiber also has allowed manufacturing line speeds to be significantly increased, and has improved connectorization efficiency.

BRIEF DESCRIPTION OF THE DRAWINGS

The preferred embodiments of the invention are described in the several drawings, in which.

DETAILED DESCRIPTION OF THE INVENTION

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
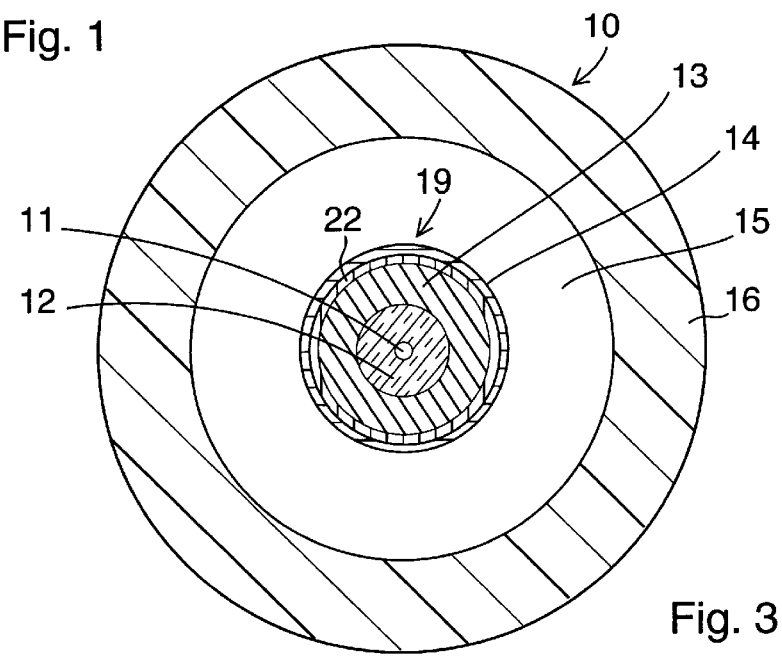
FIG. 1 is a cross-sectional view of an inventive 900 μm buffered fiber.

Shown in FIG. 1 is an inventive 900 μm buffered fiber 10. The coated optical fiber 19 of the example shown, included in buffered fiber 10, includes a core 11, a cladding 12, a first protective coating 13, an ink layer 22, and an outer coating 14. The optical fiber in the example shown is made up of the core 11 and the cladding 12. The optical fiber coating in the example shown is made up of first protective coating 13, ink layer 22, and an outer coating 14. Outer coating 14 forms the outer surface of the optical fiber coating.

The diameter of first protective coating 13 may be 245 μm. As in prior art cables, a Corning SMF-28 CPC6 single-mode optical fiber may form elements 11, 12, and 13. Ink layer 22 may have an outer diameter of approximately 261 μm.

Outer coating 14 is formed of a non-stick material. The outer diameter of outer coating 14 may be approximately 273 μm.

One example of a suitable non-stick material which may be used to form form outer coating 14 is a mixture of a solid lubricant and a film-forming binder. The film-forming binder may be an acrylic polymer. An example of a suitable solid lubricant is polytetrafluoroethylene (TEFLON™). The coated optical fiber 19 in this case may be prepared by coating the external surface of the ink layer 22 with a mixture comprising a liquid carrier, a film-forming binder, and TEFLON particles. The liquid carrier, which may for example be water, may then be removed through evaporation by passing the coated optical fiber 19 through an oven. For further details of such mixtures of the type described in this paragraph and methods for applying such mixtures, see U.S. Pat. No. 5,181,268 assigned to Coming Incorporated, which patent is hereby incorporated by reference.

Another example of a suitable non-stick material which may be used to form forming outer coating 14 is a mixture of a solid lubricant and a film-forming binder which is cross-linked. For example, the solid lubricant may comprise polytetrafluoroethylene particles such as TEFLON, and the film-forming binder may be a cross-linked epoxy acrylate polymer. Mixtures of this type may be applied as a non-aqueous liquid dispersion, and the cross-linkable epoxy acrylate polymer then may be cross-linked by ultraviolet radiation. For further details of such mixtures of the type described in this paragraph and methods for applying such mixtures, see U.S. Pat. No. 5,408,564 assigned to Siecor Corporation, which patent is hereby incorporated by reference.

Tube 16 is then extruded about coated optical fiber 19. The outer diameter of tube 16 may be about 900 μm, and the inner diameter of tube 16 may be in the range 300 to 500 μm, with a preferred value being 400 μm. The space 15 between coated optical fiber 19 and the inner surface of tube 16 is unfilled, with no tensile fibers or water-blocking or water-absorptive filling compounds inserted therein. Tube 16, together with coated optical fiber 19, constitute the 900 μm buffered fiber 10.

Tube 16 may be formed of any material, such as polyvinyl chloride material, suitable for use as the jacket of a 900 μm buffered fiber. Suitable compounds inserted therein. Tube 16, together with coated optical fiber 19, constitute the 900 μm buffered fiber 10.

Tube 16 may be formed of any material, such as polyvinyl chloride material, suitable for use as the jacket of a 900 μm buffered fiber. Suitable materials may have a tensile strength in the range of 2000–4000 PSI per ASTM D-412, an oxygen index percentage of 28 to 50 per ASTM D-2863, and a specific gravity in the range of 1.25 to 1.65 per ASTM D-792. If the cable is required to have a riser or plenum rating, such must be taken into account in the choice of materials for the cable to achieve required flame retardance or low smoke generation standards. A suitable material for use in riser applications is Vista 46801 Natural-03, and a suitable material for use in plenum applications is PLE-NEX® 2400F, both supplied by Vista Chemical Company.

Figure 2:
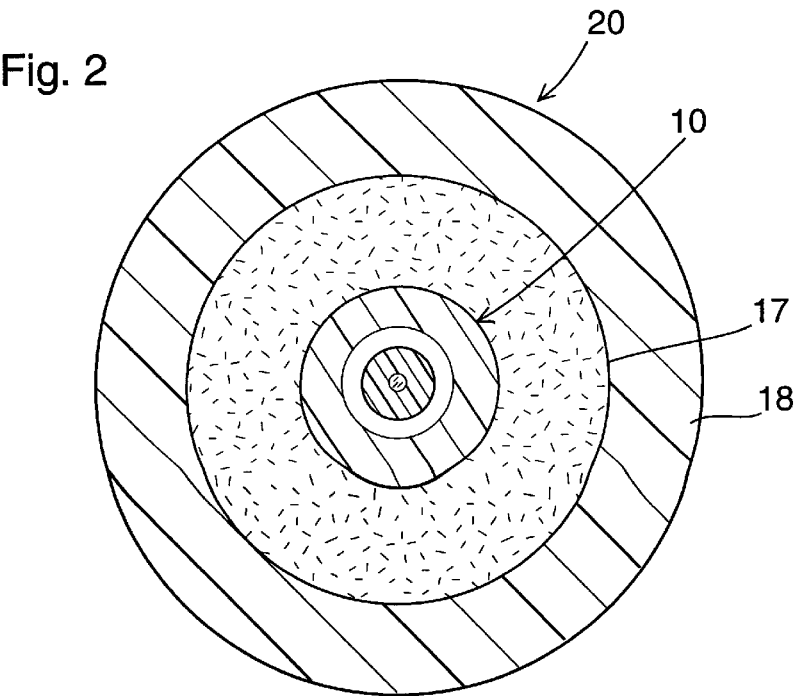
FIG. 2 is a cross-sectional view of an interconnect cable employing the 900 μm buffered fiber of FIG. 1; and, FIG. 3 is a perspective view of a connectorized interconnect cable according to the invention.

A vertical extrusion process may be used to form tube 16 about coated optical fiber 19. No vacuum is applied to the extrudate forming tube 16 as the extrudate exits the extrusion die. After the extrudate leaves the die, a water bath may be used to cool the material forming tube 16. To reduce post-extrusion tube shrinkage, a first water bath at an elevated temperature followed by a later water bath at room temperature may be used. A vertical extrusion line may have a line speed of 150 m/min, significantly increasing the line speed used for the former buffered optical fiber which included aramid fibers in space 15. Shown in FIG. 2 is a single-fiber interconnect cable 20 which includes a buffered optical fiber 10 as shown in FIG. 1. A horizontal manufacturing line may be used to extrude outer cable jacket 18. A lay plate stationed at the entrance to the jacket extruder may be used to guide tensile strength fibers 17 around buffered optical fibers 10 as the extrudate forming cable jacket 18 is extruded over tensile strength fibers 17. Aramid fiber yarns such as KEVLAR™ are a suitable example of yarns which may be used as tensile strength fibers 17. Tube 18 may be formed of polyvinyl chloride material.

Figure 3:
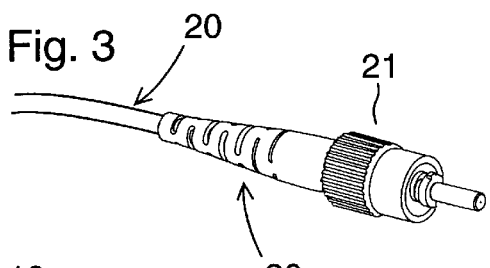

A connectorized interconnect cable 30 is shown in FIG. 3. The connectorized cable 30 comprises a connector 21 which is mounted to interconnect cable 20. Connector 21 may, for example, be an ST-compatible connector. Connectorization efficiency is enhanced by the inventive cables, as it is unnecessary to trim back any tensile strength fibers between the coated optical fiber 19 and tube 16.

The Bellcore specification GR-326 requires that in environmental testing over the range of −40° C. to +75° C., a connectorized interconnect cable should experience an increase in attenuation equal to or less than 0.30 dB as compared with its attenuation at room temperature. In testing, 14 inventive connectorized interconnect cables all passed this requirement, with the maximum increase in attenuation at either 1310 or 1550 nm measured at 0.228 dB.

Inventive buffered optical fibers have been shown to pass all requirements of Bellcore GR-409 Issue 1, with the exception of High Temperature Cable Bend. Plenum rated inventive buffered fibers may include a tube 16 formed of flame-retardant PVC material. Multifiber cables including inventive buffered optical fibers have been shown to pass all requirements of Bellcore GR-409.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A buffered optical fiber, comprising:
    an optical fiber, said optical fiber comprises an outer surface;
    a protective tube surrounding said optical fiber, said protective tube is monolithically formed of a high strength polymeric material, does not include strength members, and is not embedded in a flooding compound, a gap existing between said outer surface of said optical fiber and an inner surface of said protective tube, said protective tube comprises an outer surface, a nominal thickness of said protective tube defined between said inner and outer surfaces thereof, said nominal thickness being about 200 to 300 microns.

2. The buffered optical fiber of claim 1, wherein said protective tube consists essentially of a single tubular member.

3. The buffered optical fiber of claim 1, wherein said protective tube outer surface has a nominal OD of about 1,000 microns or less.

4. The buffered optical fiber of claim 1, wherein said inner surface of said protective tube has a non-stick surface.

5. The buffered optical fiber of claim 1, wherein said outer surface of said optical fiber comprises a coating having a nonstick surface.

6. The buffered optical fiber of claim 5, wherein said coating is a TEFLON material.

7. The buffered optical fiber of claim 1, wherein said gap is non-filled.

8. The buffered optical fiber of claim 1, wherein said high strength material has a tensile strength between 2000–4000 PSI.

9. The buffered optical fiber of claim 1, wherein said protective tube outer surface has a nominal OD of about 900 microns or less.

10. A buffered optical fiber with a nominal OD of about 850–950 microns, comprising:
    an optical fiber, said optical fiber having an outer surface;
    a protective tube surrounding said optical fiber, said protective tube not being embedded in a flooding compound, a gap existing between said outer surface of said optical fiber and an inner surface of said protective tube, said protective tube formed of a high strength polymeric material resisting thermal effects without reinforcing members incorporated within said protective tube.

11. The buffered optical fiber of claim 10, wherein said high strength material has a tensile strength between 2000–4000 PSI.

12. The buffered optical fiber of claim 10, wherein said protective tube consists essentially of a single tubular member.

13. The buffered optical fiber of claim 10, wherein said inner surface of said protective tube has a non-stick surface.

14. The buffered optical fiber of claim 10, wherein said outer surface of said optical fiber comprises a non-stick surface.

15. The buffered optical fiber of claim 10, wherein said gap is non-filled.

16. The buffered optical fiber of claim 10, wherein said gap includes at least one tensile strength member.

17. The buffered optical fiber of claim 10, wherein said protective tube outer surface has a nominal OD of about 900 microns.

18. The buffered optical fiber of claim 10, said protective tube having a thickness of about 200–300 microns.

19. A buffered optical fiber with a nominal OD of about 850–950 microns, comprising: an optical fiber, said optical fiber having an outer surface with a coating comprising a non-stick surface; a protective tube surrounding said optical fiber, said protective tube not being embedded in a flooding compound, a gap existing between said outer surface of said optical fiber and an inner surface of said protective tube, said protective tube formed of a high strength polymeric material resisting thermal effects without reinforcing members incorporated within said protective tube.

20. The buffered optical fiber of claim 19, wherein said high strength material has a tensile strength between 2000–4000 PSI.

21. The buffered optical fiber of claim 19, said protective tube having a thickness of about 200–300 microns.

22. The buffered optical fiber of claim 19, wherein said protective tube inner surface includes a coating comprising a non-stick surface.

23. The buffered optical fiber of claim 19, wherein said gap is non-filled.

24. The buffered optical fiber of claim 19, wherein said gap includes at least one tensile strength member.

25. The buffered optical fiber of claim 19, wherein said protective tube outer surface has a nominal OD of about 900 microns.

26. A buffered optical fiber with a nominal OD of about 850–950 microns, comprising:
    an optical fiber, said optical fiber having an outer surface with a coating comprising a non-stick surface;
    a protective tube surrounding said optical fiber, a gap existing between said outer surface of said optical fiber and an inner surface of said protective tube, said protective tube formed of a high strength polymeric material whereby the maximum attenuation increase over the range of −40C.° to +75C.° is less than about 0.3 dB.

27. The buffered optical fiber of claim 26, wherein said maximum attenuation increase over the range of −40C.° to +75C.° is less than about 0.228 dB.

28. The buffered optical fiber of claim 26, wherein said high strength polymeric material resists thermal effects without reinforcing members incorporated within said protective tube.

29. The buffered optical fiber of claim 26, wherein said high strength material has a tensile strength between 2000–4000 PSI.

30. The buffered optical fiber of claim 26, said protective tube having a thickness of about 200–300 microns.

31. The buffered optical fiber of claim 26, wherein said protective tube inner surface includes a coating comprising a non-stick surface.

32. The buffered optical fiber of claim 26, wherein said gap is non-filled.

33. The buffered optical fiber of claim 26, wherein said gap includes at least one tensile strength member.

34. The buffered optical fiber of claim 26, wherein said protective tube outer surface has a nominal OD of about 900 microns.

* * * * *